United States Patent [19]

Ohta

[11] Patent Number: 4,757,206
[45] Date of Patent: Jul. 12, 1988

[54] BAR CODE READING METHOD AND APPARATUS

[75] Inventor: Masataka Ohta, Kanagawa, Japan

[73] Assignee: Kabushiki Kaisha Sato, Japan

[21] Appl. No.: 788,729

[22] Filed: Oct. 17, 1985

[30] Foreign Application Priority Data

Oct. 24, 1984 [JP] Japan ............................ 59-221970

[51] Int. Cl.$^4$ .............................................. G06K 7/10
[52] U.S. Cl. .................................... 235/462; 235/436;
235/463
[58] Field of Search ..................... 235/436, 462, 463

[56] References Cited

U.S. PATENT DOCUMENTS 4,147,295 4/1979 Nojiri et al. .
4,528,443 7/1985 Smith .................................. 235/462
4,578,570 3/1986 Mazumder et al. ................ 235/463

Primary Examiner—David L. Trafton
Attorney, Agent, or Firm—Ostrolenk, Faber, Gerb & Soffen

[57] ABSTRACT

A bar code reading method and apparatus. Comparison reference values are calculated based upon actual measurements of the width of bars and spaces which comprise the bar code pattern and upon a prestored constant. The measured bar and space widths are compared to the reference values to determine the information represented by the bar code. Since the reference values are generated from the measured values of the bars and spaces the scanning speed is irrelevant and errors are avoided. Similarly, minor width variations, caused by inaccurate printing, between like bars or spaces do not affect reading results.

21 Claims, 10 Drawing Sheets

BAR CODE READING METHOD AND APPARATUS

BACKGROUND OF THE INVENTION

1. Field of the Invention

The present invention relates to a method of reading bar codes and an apparatus therefor, and more particularly to a bar code reading method and apparatus which are unaffected by the speed at which the bar code is scanned.

2. Background Description

Many different types of bar codes are known. FIGS. 12 to 15 show several typical bar codes. Specifically, FIG. 12 shows a bar code which is composed of thin and thick printed bars and thin and thick spaces. Thick bars and spaces represent binary "1" whereas thin bars and spaces represent binary "0".

FIG. 13 depicts a bar code which is composed of thin and thick printed bars but only thin spaces. Thick bars represent binary "1", and thin bars represent binary "0"; spaces, however, have no significance as data.

FIG. 14 shows a bar code which is composed of thin and thick spaces and thin printed bars. Thick spaces represent binary "1", and thin spaces represent binary "0", while the bars have no significance as data.

Finally, FIG. 15 shows a bar code of the J.A.N., UPC and WPC types. In this bar code a numerical character is composed of seven elements or bits of equal width. A given element may be a bar (dark) or a space. The various possible combinations of the seven elements is such that they form two bars and two spaces. The element which occupies a bar area represents binary "1" whereas each space area represents binary "0". Thus, for example, a very thick bar can be used to represent a series of three "1"s which follow one another, without separation spaces therebetween.

The portions of the bar code marked CS in FIGS. 12 and 13 represent an inter-character space and not data per se. No inter-character spaces, however, appear in FIGS. 14 and 15.

Different methods have been employed for reading bar codes. A first reading method comprises the steps of scanning the code pattern with an optical reader and generating a numerical count while each bar and space is being scanned to provide a measure of the bar's or space's width. The obtained counts are compared to a fixed reference value to determine the binary digit which it represents.

A second reading method appropriate for reading a bar code as shown in FIG. 12 comprises the steps of: scanning the bar code to obtain bar and space width counts sequentially, comparing the count of the bar read first by the optical reader with the count of the space adjacent to the first bar to determine the binary digit represented by the first bar. Or, similarly, the count of the space width which is read first is compared to the count of the adjacent bar to determine the binary digit represented by the space, and so on.

The first reading method uses a fixed reference value. However, the count of a bar or a space varies with the speed at which the optical reader scans the bars and spaces. Therefore, the speed at which the optical reader scans the bar codes must be maintained within given limits. If not, reading errors will occur. Such reading errors are common with manual sweeping.

The second reading method is disadvantageous in that it cannot be used to read a bar code as shown in FIG. 15. In the bar code of FIG. 15, the counts of bars and spaces are sequentially compared with each other to determine the binary digits they represent. Therefore, if the printing should be somewhat blurred, an incorrect count will be generated.

In an attempt to solve these problems, a reading method which is deemed to be most appropriate for reading the bar codes of the type shown in FIG. 12 has been proposed in Japanese Laid-Open Patent Application No. 57-34540 (Patent Application No. 47-113058). According to the proposed method, bars are compared to each other. Likewise, spaces are compared to each other. Thus, counts of two subsequent bar widths are compared to each other to determine which one is larger, the wider bar (larger count) being deemed to represent binary "1" whereas the narrower bar (lower count) is deemed to represent binary "0". Likewise, two subsequent spaces are compared to each other to determine which one is larger in value. The larger one (or wider space) is deemed to represent binary "1" whereas the smaller one (or thinner space) is deemed to represent binary "0".

The proposed method, however, requires subsequent bars (or spaces) to have different widths. In order to meet this requirement, a variety of bar and space widths must be used. This, however, places limits on optimizing bar density and simplicity. In an attempt to solve this problem, the inventor of Application No. 57-34540 referred to above has proposed in another invention (Japanese Patent Application Laid Open No. 55-49354; Patent Application No. 48-34732) an alternate approach. The newest proposal may be applied to a bar code composed of bars (or spaces) of equal width to determine binary digits represented by bars (or spaces) with greater accuracy.

Specifically, according to this method, the bar (or space) at the first location of the bar code will be referred to as the standard bar and its width will be referred to as a first value. The next bar (or space) will be referred to as the object bar (or space) and a second value will be defined which equals the width of the object bar (or space) multiplied by a constant K which is greater than 1. A third value is generated which is calculated by taking actual value of the object bar and dividing it by the constant K. Then a determination as to whether the object bar (or space) represents a "0" or a "1" is made as follows:

(1) if the first value is larger than the second value, the object bar (or space) is thin, representing binary "0";

(2) if the first value is smaller than the third value, the object bar (or space) is wide, representing binary "1"; and (3) if the first value is smaller than the second value but larger than the third value, the object bar appears to be equal in width to the standard bar (or space), and the determination whether the object bar (or space) represents a "0" or a "1" is deferred until a comparison of the counts of the next bar and space widths is completed.

This last reading method, which is a combination of the previous two reading methods is free of the disadvantage of having to control the sweeping speed of the optical reader.

It does, however, have the following fault:

Let it be assumed that the width ratio of the thin bar (or space) to a thick bar (or space) is equivalent to 1:2, and that the value for the constant "K" is 1.5. Let it further be assumed that the thick bar is somewhat blurred or defective so that the actual width ratio is equal to about 1:1.4. In this case, the first value N=1; the second value equals 1.4 NK=2.10 N; and the third value=1.4 N/K=0.93 N, where "N" stands for the value of the width at the ratio of one. In the example given above the second bar (or space), namely the object bar, is wider than the standard bar (or space). According to the method described above one should obtain the result: second value>third value>first value. Instead in this case an erroneous result is obtained that: second value>first value>third value. The same error appears in respect of spaces. Also disadvantageously, the third reading method can not be applied to a bar code as shown in FIG. 15, as is the case with the second reading method.

A reading method which is exclusively applied to a bar code of FIG. 15 comprises the steps of: obtaining a value corresponding to the width of a single element or bit by scanning a start bar (not shown) with an optical reader, and making a decision as to where each subsequent bit is located on a bar or on a space. This determines whether the bit is a binary "1" or "0".

This reading method, however, again requires constant speed scanning, producing erroneous readings with manually movable optical readers.

Therefore, all the known reading methods are unsatisfactory in one respect or another.

SUMMARY OF THE INVENTION

It is an object of the present invention to provide a bar reading method which does not require constant speed scanning while still assuring correct readings irrespective of slight variations in width from one bar or space element to another.

It is another object of the present invention to provide an apparatus for effecting the above object.

According to the present invention, a comparison reference value is calculated from the bar and space data itself. The width of each bar (space) or zone or section of a bar (space) in conjunction with a given constant are used for generating the reference values. Each measured value is compared to the comparison reference value. Finally, the width of each zone is determined by determining which value is larger, the zone value or the comparison reference value.

The foregoing and other objects and advantages of the present invention will be understood from the following description which is made with reference to the accompanying drawings.

DESCRIPTION OF PREFERRED EMBODIMENTS

Figure 1:
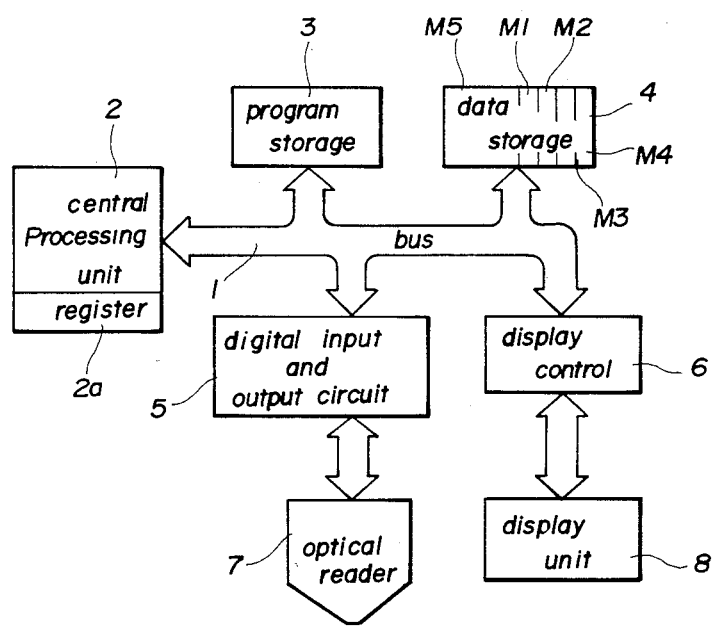
FIG. 1 is a block diagram of a bar code reading apparatus according to the present invention.

Referring to FIG. 1, a bar code reading apparatus according to the present invention comprises a CPU (central processing unit) 2, a program storage 3, a data storage 4, a digital input and output circuit 5 and a display control 6, all of which are linked together by a bus 1. CPU 2 is intended to control the operation of the entire apparatus in accordance with a program stored in program storage 3 which preferably is a read-only memory. The data storage 4 is a random access memory, which is divided into a zone width memory M1, a reference memory M2, a read-out data memory M3, a temporary memory M4 and a miscellaneous memory M5.

An optical reader 7 which is movable, by hand, across bar codes is connected to the digital input and output circuit 5. The circuit 5 is adapted to detect whether the optical reader is moving across a bar zone or space zone and to supply to the bus 1 a binary signal representing the given zone. The display control 6 translates bar code data retrieved from the read-out data memory M3 into a corresponding display data, and supplies the data to a cathode-ray tube or any other suitable display means 8.

The method of reading bar codes with the aid of the reading apparatus is now described.

Figure 11:
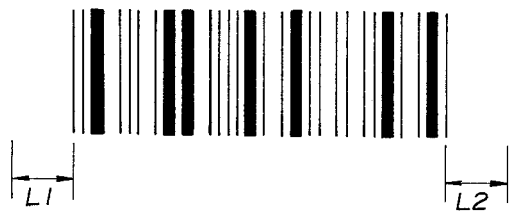
FIG. 11 shows an entire bar code.

The bar codes appearing in FIGS. 12 to 15 illustrate several different bar code standards. As previously described, different recognition methods are employed to read and convert each bar standard to the characters which they represent. First, let it be assumed that the bar code of FIG. 12 contains a required number of characters, for example the same number as in FIG. 11. The bar code is composed of combinations of thin and thick bars and thin and thick spaces. Also, let it be assumed that the width ratio between thin bar, thick bar, thin space and thick space is 1:3:2:4.

Figure 2:
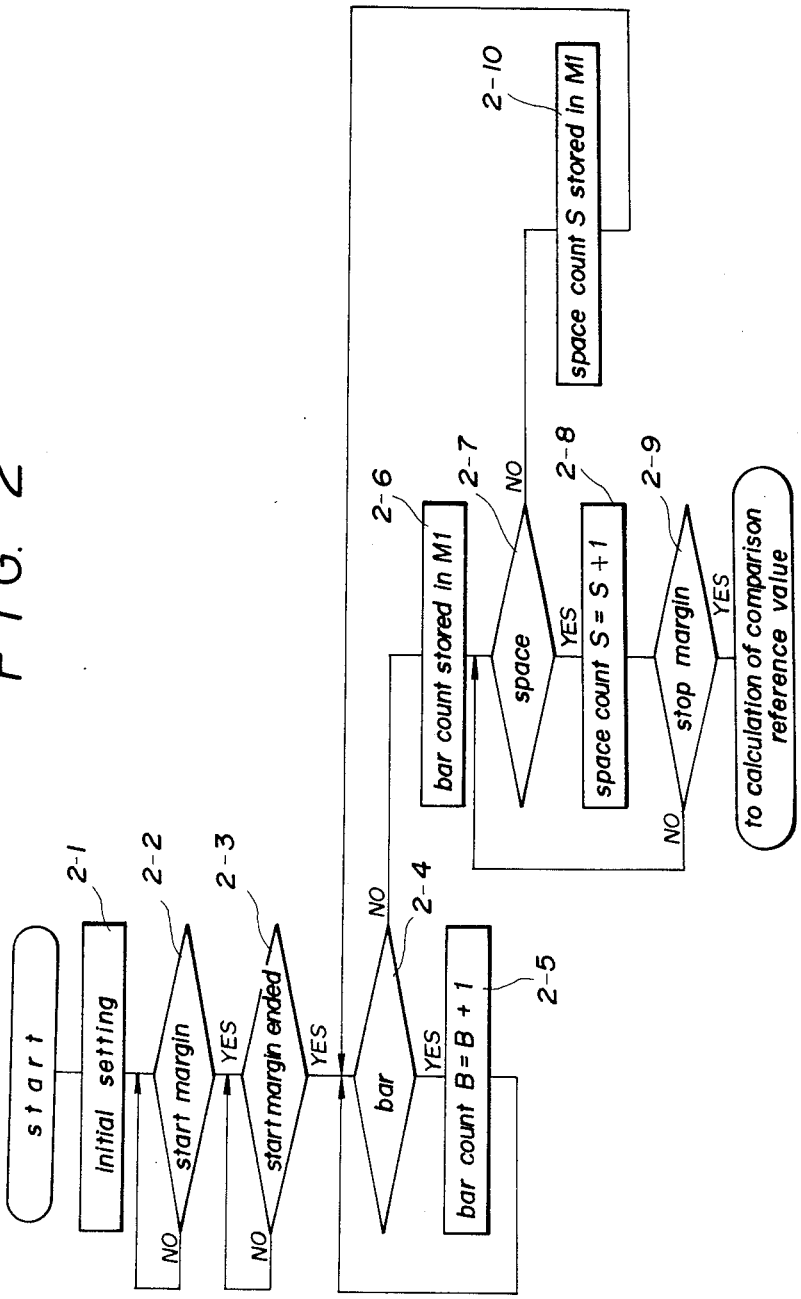
FIG. 2 is a flowchart showing the counting process.

FIG. 2 represents flowchart showing the sequence of steps for measuring the width of each bar or space. Basically, CPU 2, or suitable circuits such as counters (not shown) begin a count during the beginning of a bar or space and end the count at the end thereof. The count value varies with the width of the space or bar and is used to represent it. As part of the process, the count values are stored in the data storage memory 4.

The following steps are carried out typically. First, each unit appearing in FIG. 1 is set to a respective initial condition, as shown at box 2-1 of the flowchart. The program then waits until the optical reader 7 has finished traversing the blank space corresponding to the start margin L1 (decisional boxes 2-2 and 2-3). At Steps 2-4 and 2-5, the optical reader 7 is scanning a given bar, and one is added to a bar count B which is kept at a predetermined address in storage M5. As long as the optical reader is still scanning the first bar BA1, Steps 2-4 and 2-5 are repeated so that bar count B is incremented once in every predetermined time period. Thus, the width of the first bar BA1 is established. When the scan of the first bar BA1 has ended, bar count B is transferred from memory M5 to zone width memory M1, as shown at 2-6.

Next, it is determined whether the optical reader is traversing a space. If yes, one is added to the space count S, which is located at a predetermined address in the memory M5. It is determined whether space count S has reached a value corresponding to the stop margin L2 shown in FIG. 11. If not, Steps 2-7 to 2-9 are repeated, thereby developing a count which represents the width of the first space SP1. At the end of the first space SP1, the space count S is shifted from memory M5 to zone width memory M1, and then the program returns to Step 2-4.

By going through the flowchart of FIG. 2 several times, the widths of the second and subsequent bars BA2, BA3 . . . are determined and the corresponding counts are stored in the zone width memory M1. Similarly, the width of the second and subsequent spaces SP2, SP3 are determined and the respective count values are stored in the zone width memory M1. Thus, count values representing bar and space zone widths of the entire bar code pattern are stored. When optical reader 7 encounters the stop margin L2, the scanning of the bar code is deemed to have ended, and the calculation of the reference value follows. It should be noted that since the same count value for a bar or a space must represent identical widths, in timing a bar a dummy step (i.e., a no-operation step) may be included at 2-5 to assure that the same number of program steps are present in the loop of steps for timing a bar as appear in timing a space.

Figure 3:
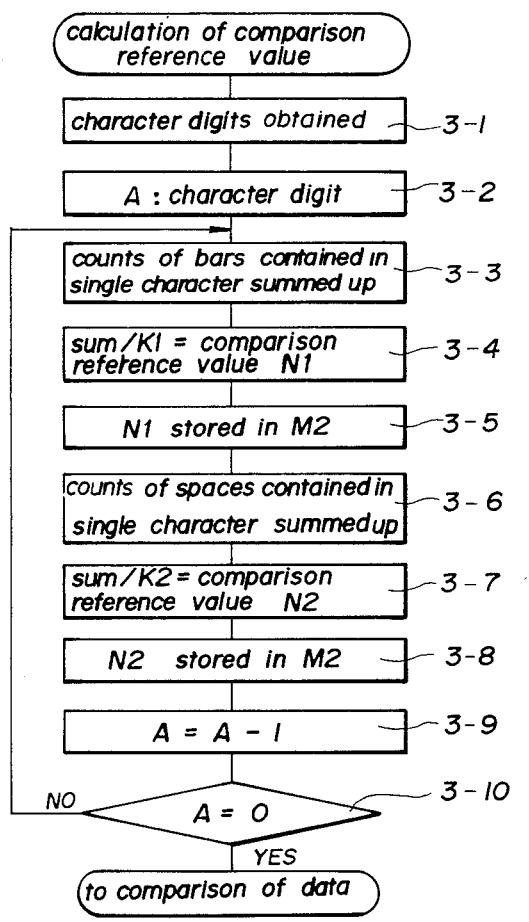
FIGS. 3, 6, 7 and 9 are flowcharts showing the generation of the comparison reference values.

At the conclusion of the counting operations, the values representing the bar and space widths are stored in the zone width memory M1. Then the value of a first digit A from the set of characters or digits represented by the entire bar code is determined at Step 3-1 in FIG. 3 (determination of a comparison reference value). The value of digit A is always set to the number of characters in the entire bar code. This digit is stored at a predetermined address of memory M5.

Counts of the four bars contained in the first character are totaled, and that total value is divided by a given constant K1 which is previously stored in program memory 3. The result is a comparison reference value N1 pertaining to the bars contained in the first character which is stored in reference memory M2. Next, the counts of the three spaces associated with the first character are totaled, and the total value is divided by a given constant K2 stored in the program memory 3. The resulting number is a comparison reference value N2 pertaining to the spaces of the first character and N2 is stored in reference memory M2. The value of K1 is selected so that the bar-comparison reference value N1 falls between the count of the thin bar and the count of the thick bar. Likewise, the value of the constant K2 is selected so that space-comparison reference value N2 is intermediate between the count of the thin space and the count of the thick space.

After reference values N1 and N2 are evaluated, the actual value of the first character A is determined. It will be remembered that A denotes the total number of characters in the entire bar code. Since A is one of those characters, its value is decreased by one to obtain a count of the other characters in the bar code. In fact, digit A is decremented each time another character has been processed. Each time a decision is made whether digit A equals zero. If not, Steps 3-3 to 3-10 are repeated to determine comparison reference values pertaining to the bars and spaces associated with each of the subsequent characters. The comparison reference values thus determined are then stored in reference memory M2. If, however, digit A is zero, the determination of the comparison reference values is deemed to have been completed and comparisons of read-out data with the comparison reference values follows.

Figure 4:
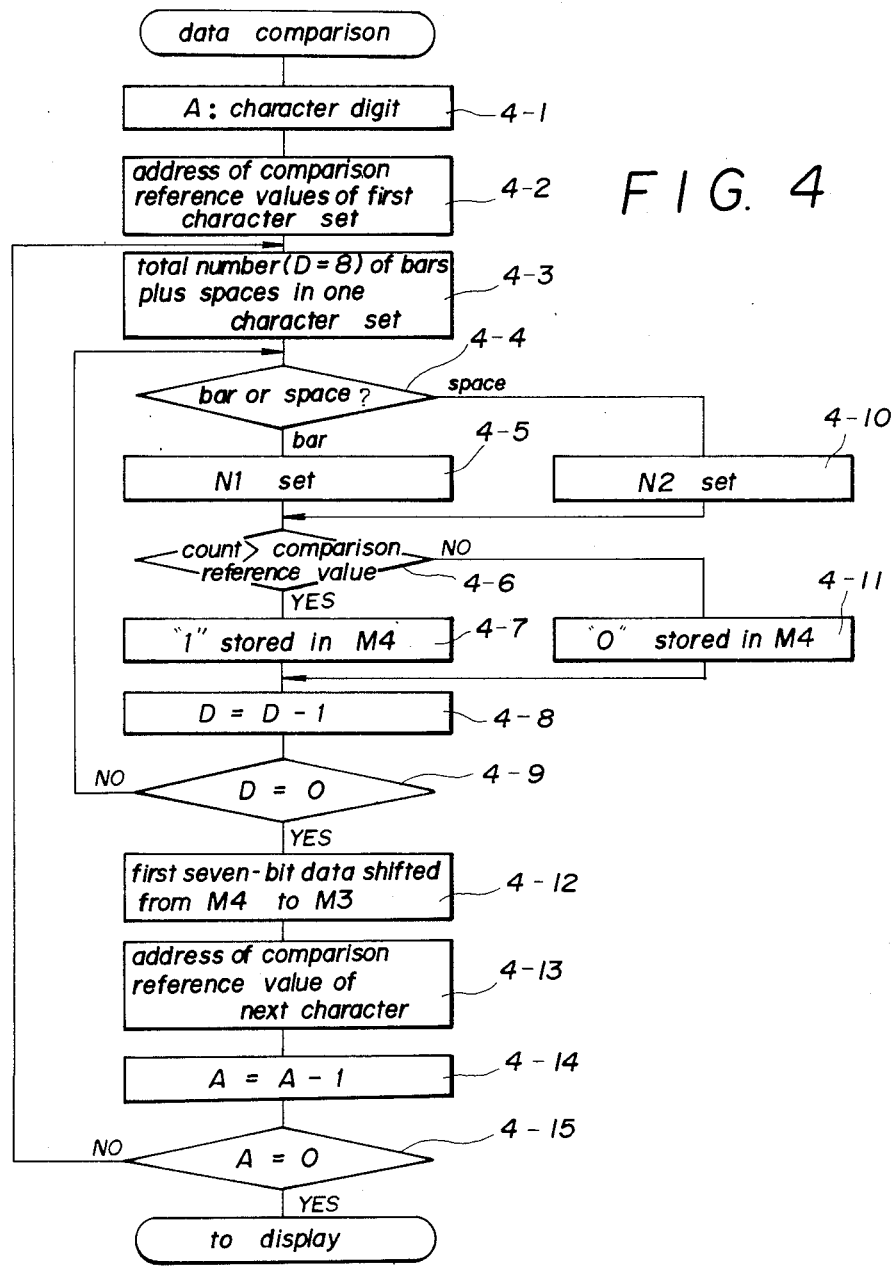
FIGS. 4, 8 and 10 are flowcharts showing the readout data comparison process.

Comparison of bars and spaces with the bar- and space-comparison reference values is described below with reference to FIG. 4.

First, at Step 4-1, the addresses of memory M2 into which comparison reference values N1 and N2 of the first character are shifted to memory M5 are set. Then, the sum of bars and spaces in the first character, designated D (8 in this case) is stored in a predetermined address of memory M5. As seen from FIG. 12, the number of bars and spaces is actually 7. The additional space which raises the total to 8 is the inter-character space CS.

At Step 4-4, a determination is made whether the first count stored in zone width memory M1 relates to a bar or a space. If it is found to relate to a bar, the bar-comparison reference N1 is shifted from memory M5 to a preselected register 2a in CPU 2. Then, at Step 4-6, the count of the first bar BA1 stored in reference memory M2 is compared with bar-comparison reference N1 which is previously in the register 2a at Step 4-5 to determine which is larger, the first bar count or the bar-comparison reference N1. If the first bar count is larger than the bar-comparison reference N1, the first bar is considered to represent binary "1". If the first bar count is smaller than bar-comparison reference N1, the first bar represents binary "0".

Binary digit "1" or "0" is stored in temporary memory M4. In the example shown in FIG. 12, the first bar BA1 is thin. Therefore, the bar count will be smaller than the bar-comparison reference N1. Thus, a binary "0" is stored.

After the state "0" or "1" of the first bar is found, D is decreased by one. A determination is made whether D is equal to zero at Step 4-9. If not zero, the set-up refers to Step 4-4. The count of the first space SP1 is stored at the second position of the zone width memory M1. The address in memory M5 of space-comparison reference N2 for the first character is referred to, and then the space-comparison reference N2 is shifted from reference memory M2 to register 2a in CPU 2. The second data stored in zone width memory M1, that is, the count representing the width of the first space SP1, is compared with the space-comparison reference value N2 now stored in register 2a to determine which is larger, the first space count or space-comparison reference value N2. If the count of the first space SP1 is larger than the space-reference value N2, the first space SP1 is a binary "1", otherwise it is a binary "0". The, binary "1" or "0" is stored in temporary memory M4. For the example of FIG. 12, the first space SP1 is thick. The count thereof is larger than the space-comparison reference value N2. Thus, a binary "1" is stored, and D is further decreased by one. The process then proceeds to Step 4-9. The operation as described thus far is repeated until all the data pertaining to the bars, spaces and inter-character space are compared to the respective references.

Finally, D will be zero at Step 4-9 signifying the end of the first character. The seven bits of the first character are stored in temporary memory M4. The data which does not include a bit for the inter-character space CS, is stored in data memory M3. At Step 4-13, the address of the comparison reference value of the first character is cleared from memory M5, and the address of the comparison reference of the subsequent character is input. Then, the value of character digit A which counts the number of characters is decreased by one at Step 4-14.

Figure 5:
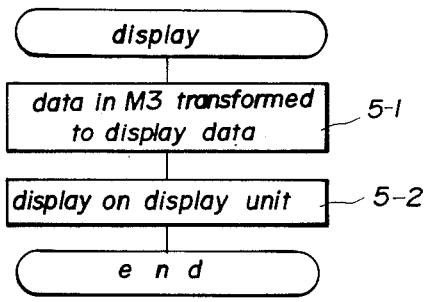
FIG. 5 is a flowchart showing the display operation process.

Next, at Step 4-15, the value of digit A is compared to zero. If it is not equal to zero, Steps 4-3 to 4-5 are repeated, thereby performing comparisons of bar and space data of each subsequent character, to determine their binary equivalents. The data obtained as a result of these comparisons is stored in data memory M3 in a predetermined order. By the time the bar and space data for every character in the bar code and storage of the resultant data has ended, the digit A will be zero. At that time, the display operation shown in FIG. 5 follows.

During a display operation, the seven-bit binary data stored in data storage M3 at Step 5-1 is retrieved and transformed into display data, which are supplied to a display control 6. Finally, the display data are shown on a cathode ray tube or any display unit for the matter under control of the display control 6.

The bar and space comparison reference values N1 and N2 according to the first embodiment are derived by summing up the bar counts of each character and dividing the sum of the bar counts by the constant K1 and by summing up the space counts of each character and dividing the sum by the constant K2, respectively. These comparison reference values, however, can be calculated differently according to a second embodiment which is similar to the first embodiment except for differences in calculating the reference values.

Figure 6:
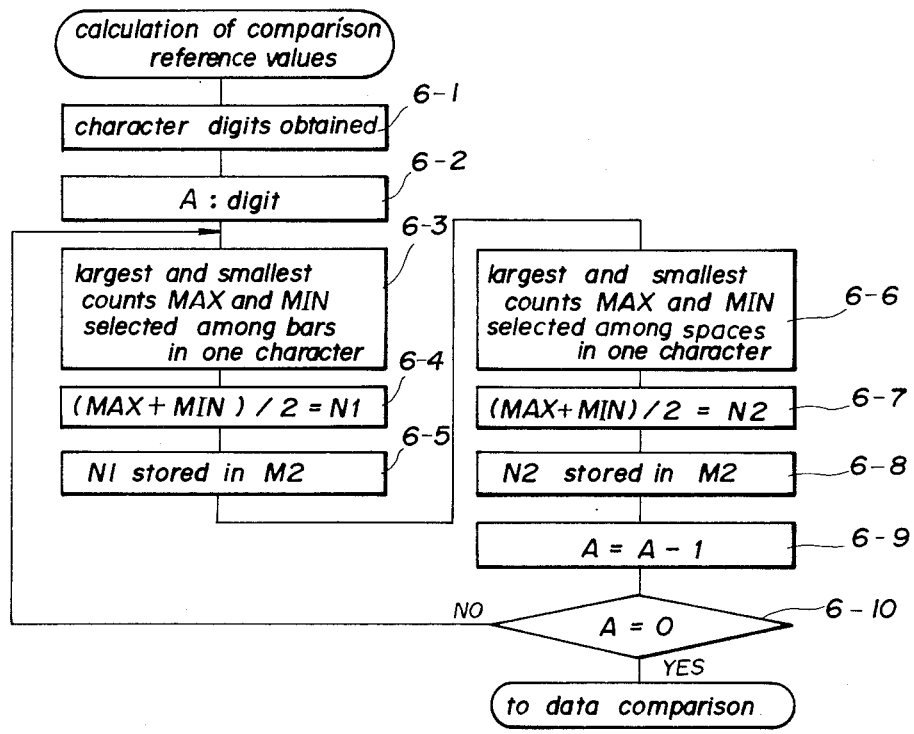

Calculation of the reference values is as shown in FIG. 6. In this method, N1 is the average of the largest and smallest bars and N2 is the average of the largest and smallest spaces. The digit A is calculated on the basis of the bar and space count data stored in zone width memory M1. Digit A, having been calculated, is stored in a predetermined address of memory M5. At Step 6-3, the largest count MAX and the smallest count MIN of the bar count of the first character are selected. At Step 6-4, the largest and smallest counts MAX and MIN thus selected are added together, and the total is divided by two. Thus, the comparison reference value N1 pertaining to the bars contained in the first character is obtained, and is stored in reference memory M2. At Step 6-6, the largest and smallest counts MAX and MIN of the space counts of the first character are selected. At Step 6-7, the largest and smallest counts MAX and MIN thus selected are averaged. Thus, reference value N2 associated with the spaces of the first character is obtained and later stored in reference memory M2.

Next, character digit A is decremented, and at Step 6-10 the decision whether it equals zero is made. If not equal to zero, Steps 6-3 to 6-10 are repeated, thereby calculating the bar- and space-comparison reference values N1 and N2 pertaining to the second, third and subsequent characters. When the calculations of comparison reference values of all remaining characters have been completed, the character digit will assume a value of zero. The remainder of the procedure follows that which has been described with reference to FIG. 4.

In the above example, the bar- and space-comparison reference values N1 and N2 are determined by summing up the largest- and smallest-bar and space counts and by dividing these sums by two. However, a different calculation is possible. Assuming that a character always contains one thick bar or space, and three thin bars and/or spaces, the bar- and space-comparison reference values N1 and N2 can be calculated by adding the largest count to the count which occurs at a predetermined order of the second to fourth counts and then dividing the sum by two.

In the first and second embodiments, the bar- and space-comparison reference values N1 and N2 are calculated separately for each character. Alternatively, one reference value N1 and one reference value N2 can be used for the entire bar code. This calculation will be described below with reference to a third embodiment.

The basic calculations are the same as described with reference to FIG. 2 for the first and second embodiments.

Figure 7:
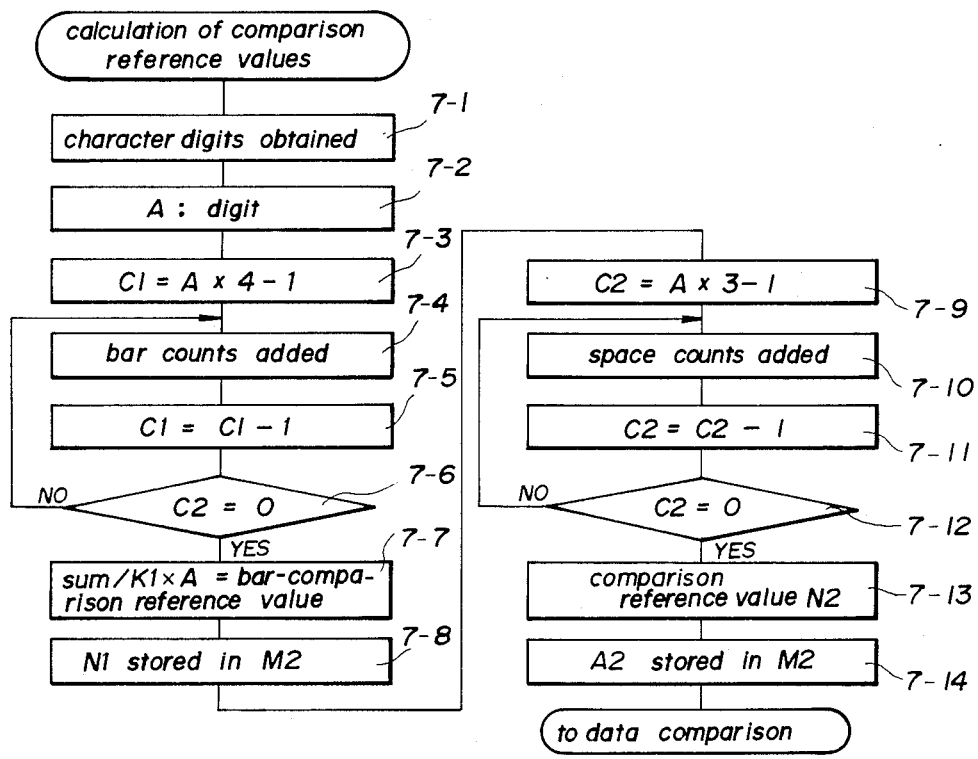

The procedure according to which the comparison reference values are calculated are given in FIG. 7. In a manner similar to the examples of FIGS. 3 and 6, the character digit A is obtained and stored in memory M5. But here the similarity ends. At Step 7-3, the character digit A is multiplied by the number of the bars contained in a single character, that is, four, and one is subtracted from this value. This value represents the number of additions C1, and which also corresponds to the bar widths in the overall bar code, is obtained and is stored in memory M5.

At Step 7-4, the count of the first bar and the count of the second bar are added together, and the sum is stored in a predetermined address of the memory M5. At Step 7-5, the number of additions C1 is decremented by 1, and then at Step 7-6 it is determined whether C1 is zero. If it is not, the count of the next bar width is added to the summed value at Step 7-4. In this way, Steps 7-4 to 7-6 are repeated until the counts of all the bars in the entire bar code are added up, i.e. until C1 decreases to Zero (C1=0). Then, at Step 7-7, the total of the above additions is divided by the product of the constant K1 and the character digit A, thereby providing the bar-comparison reference value N1 of the whole bar code. At Step 7-8, this value of N1 is stored in reference memory N2.

At Step 7-9, the character digit A is multiplied by the number of spaces in a single character, or three, and one is subtracted from the resultant value. The resultant value provides a number C2 which determines the number of additions that will take place for the entire bar code. That number is stored in a predetermined address of memory M5.

Next, at Step 7-10, the count of the first space and the count of the second space are added together, and the resultant value is stored in a predetermined address of memory M5. At the same time, one is subtracted from C2. At Step 7-2, C2 is compared to zero. If it does not compare, Step 7-10 is repeated where the result of additions stored in memory M5 and the count of the next space are added together. In this manner, Steps 7-10 to 7-12 are repeated until the counts of all the spaces in the bar code are added together, and the result of the addition is stored in a predetermined address of the memory M5. When the sum of all the space counts of the entire bar code has been obtained (C2=0), the sum is divided by the product of constant K2 and the character digit, thereby providing a space-comparison reference value N2. At step 7-14, the space-comparison reference thus obtained is stored in reference memory M2 after which data comparison follows.

Figure 8:
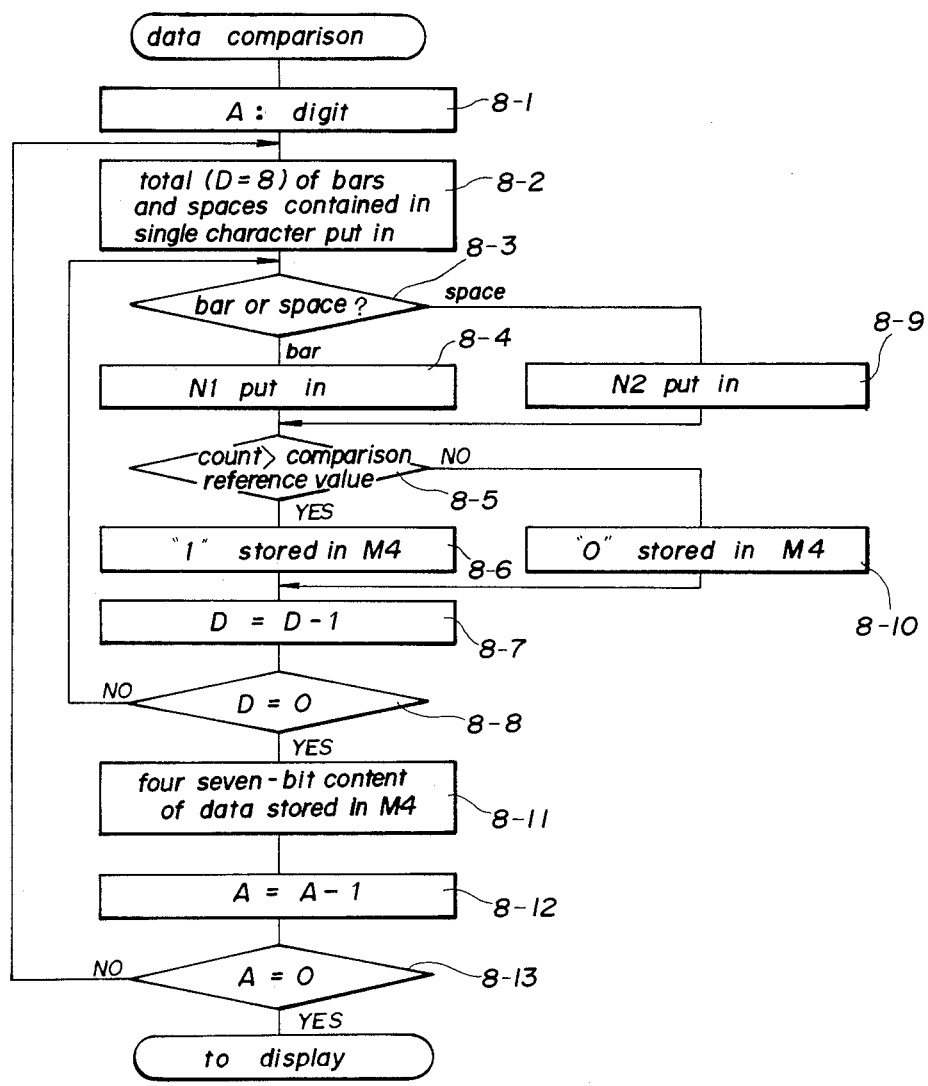

Data comparison in this embodiment, which differs from that in the first and second embodiments, is described below with reference to FIG. 8.

First, character digit A is stored in storage M5. At Step 8-2, the value D=8 which is the total number of bars and spaces in a single character plus the inter-character space is stored in a predetermined address of storage M5. A determination is then made whether the first count stored in zone width memory M1 relates to a bar or a space. If to a bar, the barcomparison reference value N1 is transferred from reference memory M2 to register 2a of CPU 2, and at Step 8-5 the bar count is compared to the bar-comparison reference value N1. If the count is larger than the reference value, the bar whose count has just been compared with the bar-reference value represents a binary "1". If the count is smaller than the reference, the bar is a binary "0". The result is stored in temporary memory M4, and at the same time one is subtracted from D. Then, at Step 8-8, a decision is made whether D is zero. If yes, the procedure reverts to Step 8-3 where a decision is made whether the next count stored in zone width memory M1 relates to a bar or a space. If to a space, at Step 8-9, the space-comparison reference value N2 is moved from the reference memory M2 to register 2a of CPU 2, and at Step 8-5 the space count is compared to space-comparison reference value N2. If the count is larger than N2, the space represents binary "1". If the count is smaller, the space represents binary "0". The result is stored in temporary memory M4.

Thus, the comparison of all the bars and spaces to their references are carried out. When all the comparisons have been made, D is at zero. Next, at Step 8-11, the first seven-bit data portion of the read-out data stored in temporary memory M4 which represents the part of the read-out data exclusive of the inter-character space CS, is stored in the read-out data storage M3. At Step 8-12, character digit A is decremented, and at Step 8-13, a decision is made whether A is equal to zero. If not equal to zero, Steps 8-2 to 8-13 are repeated, thereby performing the bar- and space-comparisons with regard to the second, third and subsequent characters. When the bar- and space-comparison operations for the entire bar code have been carried out, character digit A will be at zero, and the display procedure as described above with reference to FIG. 5 follows.

Figure 12:
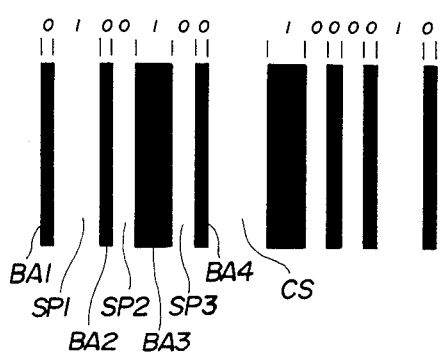
FIGS. 12., 13, 14 and 15 show a variety of bar codes.
Figure 13:
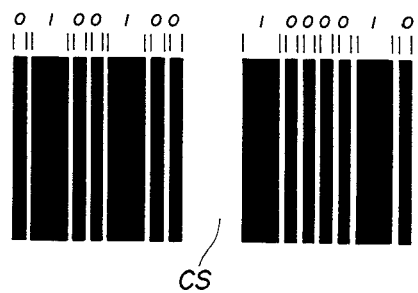
Figure 14:

The bar code reading methods of the first, second and third embodiments are applicable to bar codes which use thin and thick bars and thin and thick spaces where thick marks represent binary "1" and thin marks binary "0" (see FIG. 12). The same bar code reading method may, however, be equally applicable to bar codes which use thin and thick bars and thin spaces (FIG. 13) or thin and thick spaces and thin bars (see FIG. 14).

If it is applied to bar codes using thin and thick bars and thin spaces, the calculation of the space comparison reference value and the space-comparison operation may be omitted. Specifically, Steps 3-6 to 3-8 may be omitted from the calculation of reference values given in FIG. 3; Steps 6-6 to 6-8 may be omitted from the calculation of reference values given in FIG. 6. Also, Steps 4-4, 4-10 and 4-12 may be omitted from the data comparison procedure of FIG. 4.

At step 4-3, D may be set at 7, and at Steps 4-7 and 4-11, binary "1" and "0" may be stored directly in read-out data memory M3. In the data comparison operation given in FIG. 8, Steps 8-3, 8-9 and 8-11 may be omitted, and at Step 8-2, D may be set at 7. At Steps 8-6 and 8-10, binary "1" or binary "0" may be stored directly in the read-out data memory M3.

In the case of a bar code composed of a combination of thin bars and thick and thin spaces, the calculation of the bar-comparison reference value and the bar data comparison may be omitted, as described with reference to the reading of the bar code using thin and thick bars and thin spaces.

The above embodiments are described as being applied to reading a bar code in which either bar or space can have two different widths. A bar code in which either the bars or the spaces have three or more different widths can be read if two or more reference values are used.

For example, in reading a bar code in which the bar or space has three different widths, a first reference value may be set at a value intermediate between the count of the thin element and the count of the intermediate-thick element, and a second reference value may be set at a value intermediate between the count of the intermediate-thick element and the count of the thick element. Width determination can be carried out by determining which is larger, the count of an object element or the first comparison reference, and as to which is larger, the count of an object element or the second comparison reference.

All the above described embodiments are described such that thick elements represent binary "1" and thin elements represent binary "0". However, the bar code reading method can also be applied to a bar code in which each bit of this seven-bit character is composed of, for example, two bars and two spaces. Each bit occupies a definite spot which is located within the bars represents binary "1" and each bit located in the spaces represents binary "0" (see FIG. 15).

Figure 9:
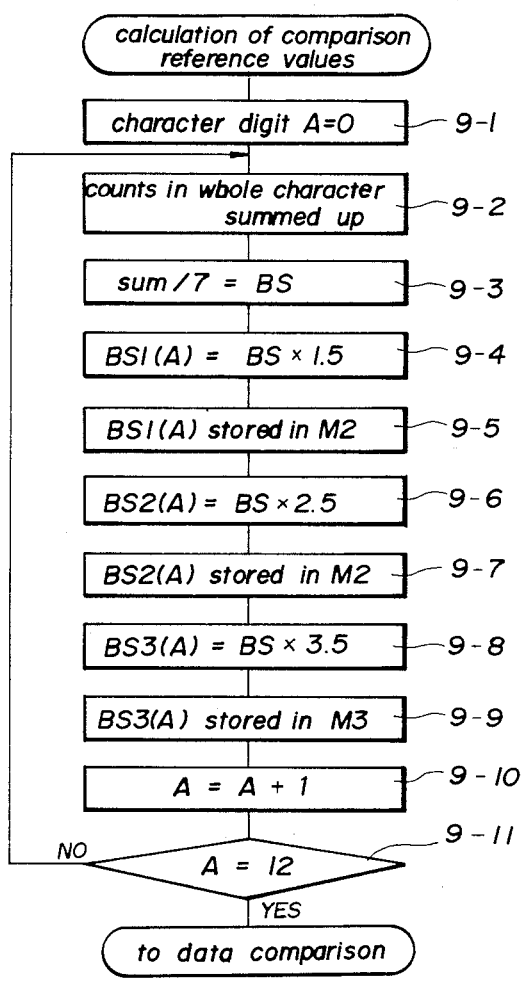
Figure 10:
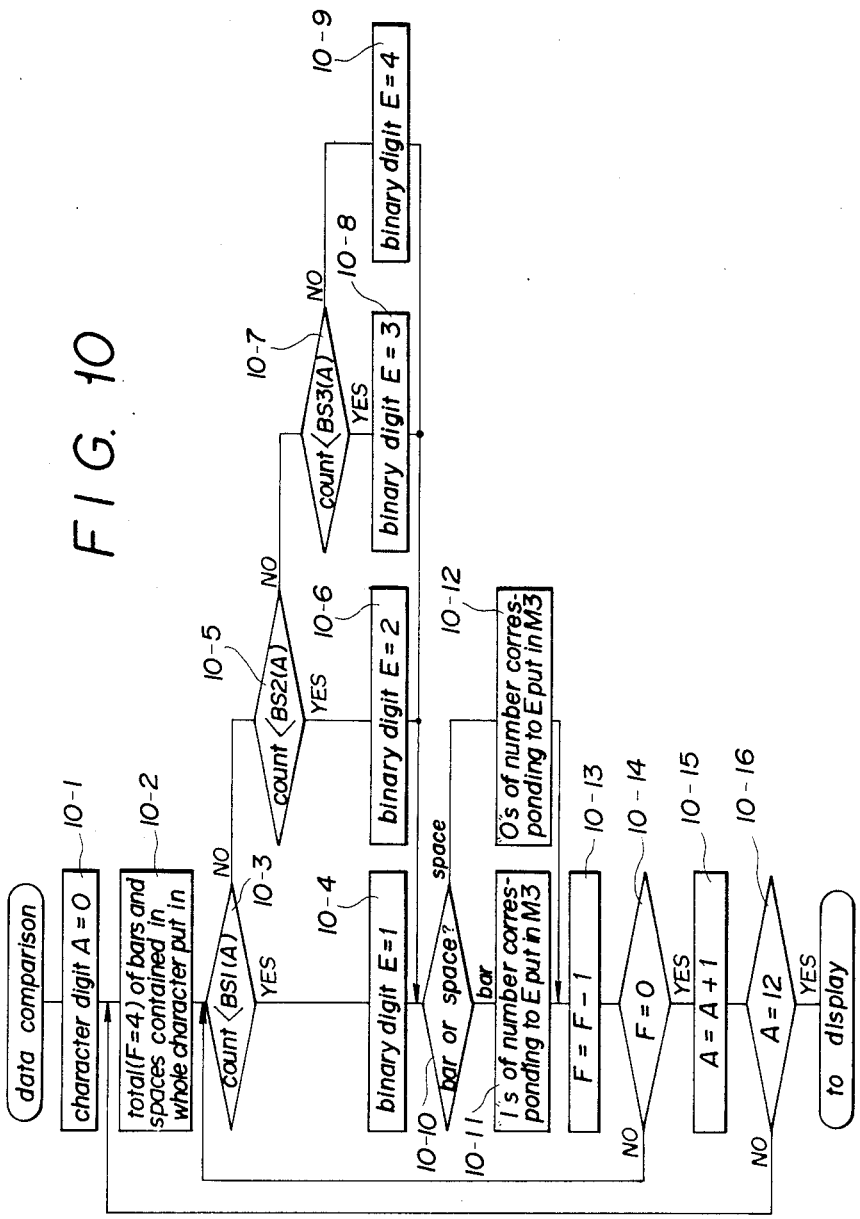
Figure 15:
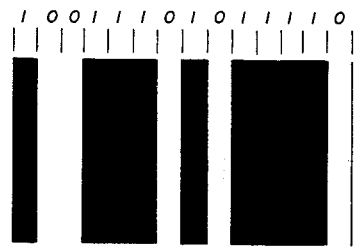

A bar code reading method which is usable with the bar code as shown in FIG. 15, is described by reference to FIGS. 9 and 10. In this particular example, bars and spaces may have different widths which range from one space or up to four bit spaces.

The width determination for each bar and space is the same as described before with reference to FIG. 2. In calculating the reference values, the character digit A (A=0) is stored in a predetermined address of memory M5 at Step 9-1.

Next, at Step 9-2, the bar and space counts of the first character are summed up, and the total is divided by seven, thereby providing an average count BS corresponding to one bit space. At Step 9-4, the average count BS is multiplied by 1.5, thereby providing a first comparison reference value BS1(A) having a value intermediate between the count for one bit and the count for two bits. At Step 9-5, the first comparison reference value BS1(A) is stored in reference memory M5. Likewise, at Step 9-6, an average count BS of one bit is multiplied by 2.5, thereby providing a second comparison reference value BS2(A) intermediate between the count for two bits and the count for three bits, and the second comparison reference is stored in reference memory M2. At Step 9-8, the one-bit average count BS is multiplied by 3.5, thereby providing a third comparison reference value BS3(A) intermediate between the count of three bits and the count of four bits. The third comparison reference value is stored in reference memory M2.

Next, character digit A is incremented by one, and at Step 9-11, it is compared to 12. In this particular example, character digit A is equal to 12. This value is stored in memory M5 of the read-out data memory 4 or in program storage 3. If digit A, upon comparison, is not equal to 12, the process reverts to Step 9-2, wherein the first, second and third comparison reference values BS1(A), BS2(A) and BS3(A) for subsequent characters are calculated, and stored in reference storage M2. In this manner, the reference values of all the characters are determined. At the end of this phase, character digit A will be equal to 12. Data comparison then follows in accordance with FIG. 10.

First, at Step 10-1, character digit A (A=0) is stored in a predetermined address of memory M5, and at Step 10-2 the total F (F=4) of bars and spaces in a single character is stored in a preselected address of memory M5.

At step 10-3, the first count stored in zone width memory M1 is compared to first comparison reference values BS1(A) by the first character. If the first count is smaller than BS1(A), the element is considered to be one full bit wide, and a binary digit E=1 is stored in a preselected address of memory M5. If the first count is larger than reference BS1(A), then at Step 10-5 the first count is compared to the second comparison reference BS2(A). If the first count is smaller than the second comparison reference BS2(A), the element is two bit wide, and E is set to 2 and stored in a preselected address of memory M5. If the first count is larger than reference BS2(A), then at Step 10-7, it is compared to the third comparison reference value BS3(A). If the count is smaller than the reference value, the count represents a three-bit wide element, i.e. E=3. Otherwise, the count is regarded as being four-bit wide, and E is set to 4 and stored in a preselected address of memory M5.

Next, at Step 10-10, it is determined whether the element whose width has just been counted is a bar or a space. If it is a bar, a number of binary "1"s equal in number to E are stored in the read-out data memory M3. Otherwise, "0"s are stored in the read-out data memory M3.

Then the total F of bars and spaces in the entire character is decremented by one, after which, at step 10-14, F is compared to zero. If non-zero, Steps 10-3 to 10-14 are repeated. In this manner, comparisons of counts of the bars and spaces in the entire character is enabled. At the end, F will be zero, and one is then added to character digit A. Then, at Step 10-16, character digit A is compared to 12. If not 12, Steps 10-2 to 10-16 are repeated, thereby carrying out comparisons of subsequent bars and spaces in each character until all the comparisons with respect to the whole bar code have been completed, at which point character digit A equals 12. The display process described earlier with reference to FIG. 5 is then executed.

As is well known, bars and spaces of a format as in FIG. 15 must be well defined during the printing process. The definition of the printed bars and spaces must be within a certain tolerance. Therefore, to read the bar code of the type shown in FIG. 15, the same comparison reference value may be used with both bars and spaces. The use of one common comparison reference value is also possible in conjunction with a bar code as shown in FIG. 12, provided that the definitions of printed bars and spaces are within the tolerance limits. If printed bars are blurred beyond these limits, a common comparison reference value cannot be used.

The bar code reading method according to the present invention, as described, is usable with the different bar codes appearing in FIGS. 12 to 15. The bar code reading apparatus according to the present invention, however, can be designed to handle a selected type bar code exclusively or a variety of bar codes. A universal bar code reading apparatus must be capable of determining what type of bar code it is reading, and of carrying out the necessary calculation of comparison reference values and comparison of read-out data in a predetermined manner appropriate for that bar code format. To this end, a manually operable switch which is marked with words describing the types of bar code may be employed to identify the bar code to be read. Or, the bar code may be partly modified so as to permit the apparatus to automatically identify the bar code. Such modifications may be made in the form of a starting code or ending code, although this is not shown in FIG. 11.

As described above, in the bar code reading method according to the present invention, a comparison reference value is calculated from a value corresponding to the width of each bar and space scanned by an optical reader and from a given constant; a value corresponding to the width of each element is compared with the calculated comparison reference value to determine which is larger, the width of the element or the comparison reference value. Each element is evaluated to determine whether it represents a space in dependence on the result of the comparison.

The relationship between the comparison reference value and the count value which represents the width of each bar or space is independent of the speed at which the bar code is scanned. Therefore, accurate reading is maintained irrespective of both scanning speed and variations in the widths of like elements due to blurring of the bar code.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method for reading a bar code which includes a sequence of printed bars and spaces, either or both of the bars and spaces having two or more different standard widths associated therewith, comprising the steps of:
    measuring the width of the bars and spaces and generating respective width values representative thereof;
    storing the width values in a memory;
    calculating at least one comparison reference value from the stored width values and also based upon a stored predetermined constant, said at least one comparison reference value being proportional to said stored predetermined constant;
    comparing each width value to the calculated at least one comparison reference value; and
    determining which of the standard widths of the bars and spaces is associated with each given bar or space based on the result of the comparisons.

2. A bar code reading method according to claim 1, wherein the bars have at least two width standards and in which the spaces have one width standard.

3. A bar code reading method according to claim 2, wherein the at least one comparison reference value is calculated based exclusively on the width values of the bars.

4. A bar code reading method according to claim 1, wherein the spaces have at least two different standard widths associated therewith.

5. A bar code reading method according to claim 4, wherein the at least one comparison reference value is arithmetically related to the width values of the spaces.

6. A bar code reading method according to claim 1, wherein the printed bars and spaces are alternately arranged and wherein both the bars and spaces have at least two different width standards associated therewith.

7. A bar code reading method according to claim 6, wherein at least one of the bars and spaces has at least three different width standards associated therewith.

8. A bar code reading method according to claim 7, comprising calculating at least two comparison reference values for bars or spaces which have at least three width standards.

9. A bar code reading method according to claim 2, in which the at least one reference value comprises one common comparison reference value for both the bars and the spaces.

10. A bar code reading method according to claim 6, comprising calculating a bar-comparison reference value based on the width values of the bars, and calculating a space-comparison reference value based on the width values of the spaces.

11. A bar code reading method according to claims 3, 5, 8, 9 or 10, wherein the at least one comparison reference value comprises a respective comparison reference value for each character associated with the bar code.

12. A bar code reading method according to claims 3, 5, 9 or 10, comprising calculating the comparison reference values based on the width values of the entire bar code.

13. A bar code reading method according to claim 11, comprising calculating the comparison reference values by dividing the sum of the width values by a predetermined value.

14. A bar code reading method according to claim 12, comprising calculating the comparison reference values by dividing the sum of the width values by a predetermined value.

15. A bar code reading method according to claim 11, comprising calculating the comparison reference values by adding two width values which follow each other in accordance with a predetermined order and dividing the sum by two.

16. A bar code reading method according to claim 12, comprising calculating the comparison reference values by adding two width values which follow each other in accordance with a predetermined order and dividing the sum by two.

17. A bar code reading method according to claim 15, comprising calculating the comparison reference values by adding a maximum and a minimum width value and dividing the sum by two.

18. A bar code reading method according to claim 16, comprising calculating the comparison reference values by adding a maximum and a minimum width value and dividing the sum by two.

19. An apparatus for reading a bar code which includes a sequence of printed bars and spaces, either or both of the bars and spaces having at least two different width standards associated therewith, the apparatus comprising:
an optical reader for scanning the bars and spaces of the bar code;
a control coupled to the optical reader for controlling the optical reader to scan the bar code according to a predetermined sequence;
means for generating width values, each width value comprising a count which is representative of the width of a respective bar or space;
width memory coupled to the generating means for storing therein the width values;
a memory for holding at least one predetermined constant;
means for calculating comparison reference values based on the width values and the predetermined constant and for storing the comparison reference values in a reference memory, said calculating means being effective to calculate said comparison reference values such that said comparison reference values are proportional to said predetermined constant; and
a data memory for storing therein data obtained by comparing each of the width values with at least one of the comparison reference values and means for deriving, based on the comparisons, characters represented by the bar code.

20. The apparatus of claim 19 which comprises a central processing unit and a bus for communicating with the central processing unit;
a program memory and a data storage memory coupled onto the bus;
a digital input/output circuit for coupling the optical reader to the bus;
a display control circuit and a display unit for providing visual output of characters read by the apparatus; and
a sequence of program instructions for use by the central processing unit which comprise the means for calculating the comparison reference values.

21. A method for reading a bar code which includes a sequence of printed bars and spaces, either or both of the bars or spaces having two or more different standard widths associated therewith, the method being effective for reading a plurality of different bar code systems, comprising the steps of:
measuring the width of the bars and spaces and generating respective width values representative thereof;
storing the width values in a memory;
calculating at least one comparison reference value from the stored width values and also based upon a selected one of a plurality of stored predetermined constants, each of said constants being associated with a given bar code system, said at least one comparison reference value being proportional to said selected one of said stored predetermined constants;
comparing each width value to the calculated at least one comparison reference value; and
determining which of the standard widths of the bars and spaces associated with each given bar or space based on the result of the comparisons.

* * * * *